(12) United States Patent
Ali

(10) Patent No.: US 9,719,626 B2
(45) Date of Patent: Aug. 1, 2017

(54) INSULATION SYSTEM

(71) Applicant: Muhammad Amzad Ali, San Ramon, CA (US)

(72) Inventor: Muhammad Amzad Ali, San Ramon, CA (US)

( * ) Notice: Subject to any disclaimer, the term of this patent is extended or adjusted under 35 U.S.C. 154(b) by 290 days.

(21) Appl. No.: 14/582,058

(22) Filed: Dec. 23, 2014

(65) Prior Publication Data

US 2016/0178111 A1    Jun. 23, 2016

(51) Int. Cl.
| F16L 9/14 | (2006.01) |
| F16L 59/14 | (2006.01) |
| F16L 59/15 | (2006.01) |
| F16L 1/11 | (2006.01) |
| F16L 9/18 | (2006.01) |
| F16L 9/00 | (2006.01) |

(52) U.S. Cl.
CPC ............ F16L 59/143 (2013.01); F16L 1/11 (2013.01); F16L 9/18 (2013.01); F16L 59/15 (2013.01); F16L 9/006 (2013.01)

(58) Field of Classification Search
CPC ....... F16L 59/153; F16L 59/143; F16L 59/12; F16L 59/147; F16L 59/14
USPC .......................... 138/114, 148, 149, 137, 140
See application file for complete search history.

(56) References Cited

U.S. PATENT DOCUMENTS

| 3,020,618 A * | 2/1962 | Eward .................... B28B 21/76 138/105 |
| 3,698,440 A * | 10/1972 | Matthieu .................. F16L 9/14 138/114 |
| 3,812,886 A * | 5/1974 | Hallwood ............... F16L 59/06 138/149 |
| 3,986,341 A * | 10/1976 | DeHaan ................ F16L 59/141 138/127 |
| 4,014,369 A * | 3/1977 | Kobres, Jr. ............. F16L 59/06 138/112 |
| 4,233,816 A * | 11/1980 | Hensley ................ F16L 59/141 138/112 |
| 6,926,040 B1 * | 8/2005 | Prescott ................ F16L 59/143 138/113 |
| 7,004,203 B2 * | 2/2006 | Claussen ............... F16L 59/153 138/121 |
| 8,833,401 B2 * | 9/2014 | Blumenthal .......... F16L 59/147 138/114 |

* cited by examiner

Primary Examiner — Patrick F Brinson

(57) ABSTRACT

An insulation system insulating a carrier conduit carrying a hot gas or liquid, buried in permafrost, allows expansion and contraction of said carrier conduit, and directionally disperses heat from the conduit minimizing thawing of permafrost. A carrier conduit carries a gas or liquid. A carrier insulation encases the carrier conduit. An outer conduit encases the carrier insulation. The outer conduit top portion includes two symmetrical flanges integrally formed on two sides of said outer conduit. An outer insulation partially encases the outer conduit. There is no outer insulation on the upper part of outer conduit; and thus, outer conduit top portion remains selectively uncovered. Any heat escaping through the carrier insulation, travels in a circumferential direction along the outer conduit and not in a radial direction because of outer insulation. The heat escapes in the soil above the insulated conduit, protecting the permafrost.

13 Claims, 2 Drawing Sheets

INSULATION SYSTEM

CROSS-REFERENCE TO RELATED APPLICATIONS

The present Utility patent application claims priority benefit of the [U.S. provisional application for patent Ser. No. 61/964,243 entitled "Preventing Thaw Settlement of Pipelines Buried in Permafrost", filed 2014 Dec. 30 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Federally Sponsored Research or Development

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to an insulation system for a conduit. More particularly, the invention relates to an insulation system that insulates a carrier conduit with multiple layers of insulation and conduits and leaves a gap in the insulation to enable free expansion and contraction of the main carrier conduit, and also directional dispersion of heat.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon, By way of educational background, another aspect of the prior art generally useful to be aware of is that a pipe is a long conduit used to transport liquids or gases.

In many instances, pipelines are used to transport hydrocarbons, such as crude and refined petroleum, fuels, and other fluids including sewage, slurry, water, and beer. Typically, pipeline transport is the transportation of goods through the pipeline. The liquids and gases that are transported in pipelines and any chemically stable substance can be sent through a pipeline. Often the pipelines are placed subsurface. Often the subsurface includes permafrost.

It is known that thermal insulation reduces the transfer of thermal energy between objects of differing temperature, such that heat transfer between objects in thermal contact or in range of radiative influence is minimized. Thermal insulation can be achieved with specially engineered methods or processes, as well as with suitable object shapes and materials. Common insulation material includes foam, wool, and materials that are porous.

It is also known that when heated liquid or gas is transported through an insulated pipeline buried in permafrost, some heat may slowly escape through the insulation and thaw the underlying permafrost. Some permafrost may settle on thawing and this can be detrimental to the integrity of the pipeline.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
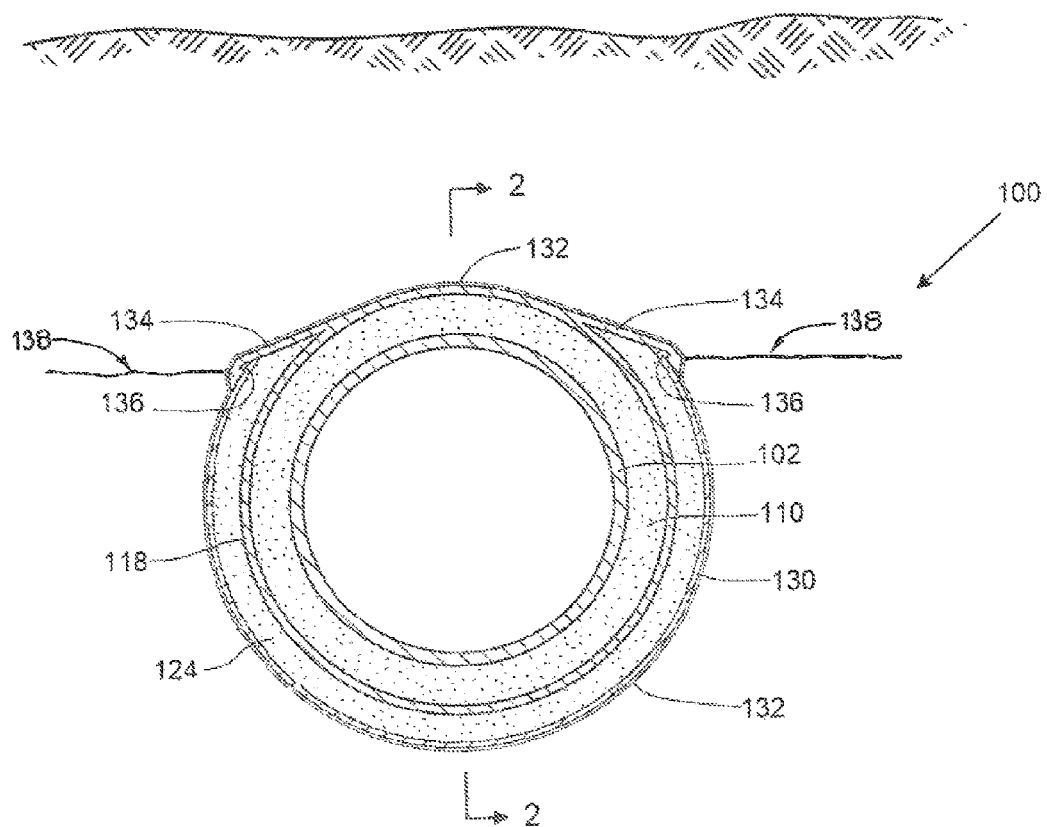
FIG. 1 illustrates a cross-sectional view of an exemplary insulation system positioned beneath an exemplary ground surface, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/limits/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, is term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a" "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

There are various types of insulation systems for conduits that may be provided by preferred embodiments of the present invention. In one embodiment of the present invention, an insulation system to prevent thawing of the permafrost may use multiple layers of insulation over a hot conduit, and directionally disperse heat from the casings to regulate the thawing of the permafrost. In some embodiments, the system may help insulate a carrier conduit that is carrying a hot gas or liquid while in a relatively colder medium or in a relatively colder environment. Those skilled in the art, in light of the present teachings, will recognize that in colder environment the hot liquid in the carrier conduit need to maintain its temperature at a certain level for ease of pumping, and thus optimal insulation is necessary. Additionally, the carrier conduit must be able to expand and contract freely to minimize damage to the material composition of the carrier pipe. In one embodiment, the uniquely configured insulation on the system may create directional dispersion of heat in a way so that any heat coming out of the carrier conduit will escape in the soil above the buried pipe, thus protecting the permafrost underneath.

An outer conduit encases the insulation around the carrier conduit, which may be called carrier insulation. In some embodiments, an outer insulation may partially encase the outer conduit. The said outer insulation covers only the bottom portion and the two sides of the outer conduit. As such, the top portion of the outer conduit remains uncovered and does not receive insulation. Two symmetrical flanges are integrally formed on two sides of the uncovered top portion of the outer conduit.

The system may further include a casing that encases the outer insulation. The outer conduit may be substantially concentric to the casing. In some embodiments, the casing may have a low thermal conductivity. Said two symmetrical flanges are configured to anchor on said casing.

In some embodiments, a thin film having a substantially moisture impermeable composition and having very low thermal conductivity may wrap around the whole assembly of carrier conduit, carrier insulation, outer conduit, outer insulation, and the casing. The film may help inhibit moisture intrusion thereby minimizing corrosion and rust.

FIG. 1 illustrates a cross-sectional view of an exemplary insulation system 100 positioned beneath an exemplary ground surface, in accordance with an embodiment of the present invention. In one aspect, an insulation system 100 may use multiple layers of insulation over a hot conduit, and directionally disperses heat implementations. In some embodiments, the system may help insulate a carrier conduit 102 that is carrying a hot gas or liquid while in a relatively colder medium or in a relatively colder environment. In another aspect, the insulation system 100 may act as a passive thereto siphon.

The gas may include, without limitation, a natural gas. The liquid may include, without limitation, oil. The system may be effective for carrying heated gas or liquid through a conduit buried in an exemplary ground, including, without limitation, a permafrost 138 or ice. Those skilled in the art, in light of the present teachings, will recognize that in colder environment the oil inside a carrier conduit need to maintain a certain temperature for ease of pumping. Therefore proper insulation is necessary.

Additionally, the system enables the carrier conduit to expand and contract freely to minimize damage to the material composition of the carrier pipe. Thus, the system provides multiple layers of insulation and conduits, strategically encasing the carrier pipe, such that the carrier conduit expands and contracts freely. In one embodiment, the uniquely configured insulation on the system may create directional dispersion of heat away from the underlying permafrost.

In some embodiments, the insulation system may include a carrier conduit that is configured to carry a gas or liquid, A carrier insulation 110 encase the carrier conduit. In some embodiments, the top portion of the conduit and insulation may be more proximal to the ground surface than the bottom portion. The carrier conduit may include, without limitation, a pipe, or a tube. Suitable materials for the carrier conduit may include, without limitation, steel, iron, and metal alloys.

The carrier insulation may be fabricated from various insulating materials configured to conform to the shapes and dimensions of the carrier conduit while still having sufficient flexibility to expand and contract freely with the carrier conduit. The carrier insulation material may include, without limitation, mineral wool, glass wool, flexible elastomeric foam, polyethylene, cellular glass, and aerogel. The carrier insulation may help inhibit heat flow from the liquid and gas.

Figure 2:
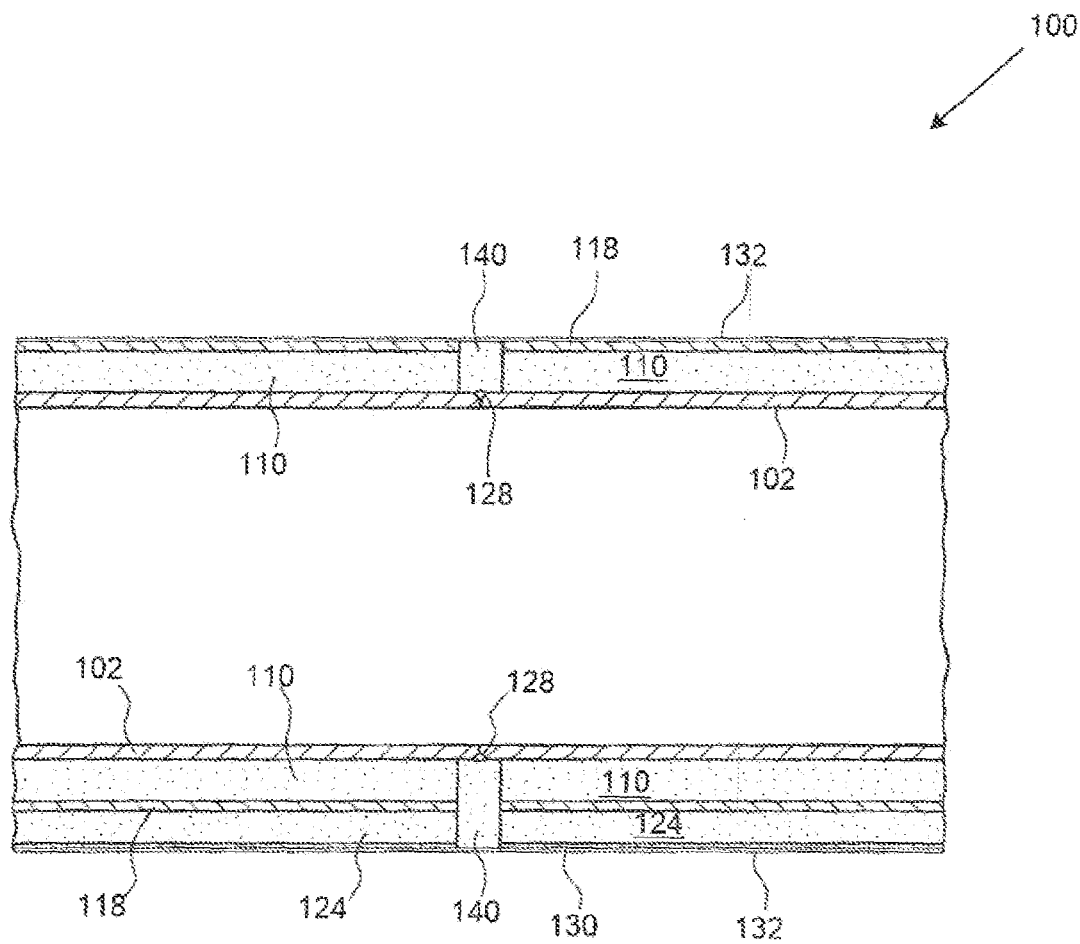
FIG. 2 illustrates a longitudinal sectional view of an exemplary insulation system taken along line 2-2 of FIG. 1, in accordance with an embodiment of the present invention.

FIG. 2 illustrates a longitudinal sectional view of an exemplary insulation system taken along line 2-2 of FIG. 1, in accordance with an embodiment of the present invention. In one aspect, an outer conduit 118 may encase the carrier insulation. The uncovered upper portion of the outer conduit may include flanges 134, one on each side. These flanges are formed integrally to the outer conduit and extend out at an angle form the outer conduit top portion. Suitable materials for the outer conduit may include, without limitation, steel, iron, and metal alloys.

In some embodiments, an outer insulation 124 may partially encase the outer conduit. As shown in FIG. 1, there is no outer insulation over the outer conduit top portion, and consequently, the outer conduit top portion remains uncovered and does not receive insulation. Whereas, the outer conduit side and bottom portions are insulated. The outer insulation material may include, without limitation, mineral wool, glass wool, flexible elastomeric foam, polyethylene, cellular glass, and aerogel. The outer insulation may help inhibit heat flow from the outer conduit to the soil below and to the soil on either side. In this embodiment the multilayered insulation system has been arranged in a way so as to induce directional dispersion of heat which can help reduce thawing of permafrost and ice.

The system may further include a casing 130 that encases the outer insulation. The outer conduit may be substantially concentric to the casing. Each end of this casing attaches to a groove 136 of the flange 134 that forms a casing anchor. In some embodiments, the casing may have a low thermal conductivity.

In some embodiments, a thin film 132 having a substantially moisture impermeable composition and very low thermal conductivity may wrap around the whole assembly of carrier conduit, carrier insulation, outer conduit, outer insulation, and the casing to prevent moisture intrusion and thereby minimize corrosion and rust.

In some embodiments, entire system and conduits may be fabricated in segments prior to delivery to field locations. Each segment may be fabricated complete with all the components as shown in FIG. 1. At each end of the segments the carrier conduit may protrude slightly to allow for field joints as shown in FIG. 2. In the field, before putting the assembled conduit in the trench, each segment of the conduit may be oriented in such a way so that the exposed area of outer conduit 118 points upward. The conduit segments may then be connected to each other by welding the carrier pipe at the ends through the field joints 128.

There may be a gap between the ends of insulations, the outer conduit, and the casing; which will be filled by an insulation strip 140. After putting the insulation strip, the thin film 132 of the adjoining conduit segments will be connected to prevent moisture intrusion. At the time of installation, both the carrier conduit and the outer conduit may have the same temperature. However, when heated oil or gas start flowing through the carrier conduit, the carrier conduit may undergo expansion while the outer conduit may not expand at all. As the outer conduit, and the two layers of insulation remain segmented because of the gaps at the field joints, the carrier conduit may be able to expand and contract freely.

Those skilled in the art will recognize that to prevent any moisture intrusion in the insulating system, the whole assembly of carrier conduit, outer conduit, and the two layers of insulations may need to be wrapped around by a very thin layer of plastic or similar film that serves as a moisture barrier. In operation, heated oil will flow through the carrier conduit. To maintain the oil temperature the carrier insulation is provided. This insulating layer will contain most of the heat within the carrier conduit. However, some heat will slowly escape through this carrier insulation and will reach the outer conduit. The heat will quickly penetrate the thickness of the outer conduit when it will encounter the outer insulation and will not be able to escape in a radial direction. Because of this, the heat may tend to move in a circumferential direction along the outer conduit towards the upper portion of outer conduit where the outer insulation is not present. Therefore, the heat which escapes through the carrier insulation will tend to escape upwards in the soil above the assembly of insulated conduit and ultimately in the atmosphere above ground. The permafrost below the conduit and to its sides will not receive much heat and, therefore, will not thaw significantly to cause any harm to the insulated conduit.

In one alternative embodiment, the carrier insulation and the outer insulation may have different thicknesses and material compositions. In another Alternative embodiment, additional layers of casings and insulation material may encase the carrier conduit to provide further insulation.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed M the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents forming during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing an insulated conduit that expands and contracts freely, and directionally disperses heat according to the present invention will be apparent to those skilled in the art. Various aspects of the invention have been described above by way of illustration, and the specific embodiments disclosed are not intended to limit the invention to the particular forms disclosed. The particular implementation of the insulated conduit that expands and contracts freely, and directionally disperses heat may vary depending upon the particular context or application. By way of example, and not limitation, the insulated conduit that expands and contracts freely, and directionally disperses heat described in the foregoing were principally directed to a system that uses multiple layers of insulation over a hot conduit and leaves gaps in the insulation to enable the carrier conduit to expand and contract freely, and directionally disperses heat implementations. The invention is to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system comprising:
    a carrier conduit being configured to carry a liquid or gas;
    a carrier insulation being configured to encase said carrier conduit, said
    carrier insulation being further configured to help minimize loss of heat from said liquid or gas;
    an outer conduit configured to encase said carrier insulation;
    an outer insulation being configured to partially encase said outer conduit, said outer insulation further being configured to help inhibit heat flow from said outer conduit to a casing around said outer insulation;
    wherein said casing is configured to encase said outer insulation, said casing comprising a substantially low thermal conductivity, said casing further being configured to help divert heat flow away from said outer insulation.

2. The system of claim 1 in which, said outer conduit top portion comprises two flanges, one on each side.

3. The system of claim 2 in which, said outer insulation comprises a wool or similar composition having a low thermal conductivity.

4. The system of claim 3 in which, said system comprises two symmetrical flanges integrally formed on two sides of an upper exposed portion of said outer conduit, said two symmetrical flanges being configured to anchor on said casing.

5. The system of claim 4 in which, said system comprises a thin film of low thermal conductivity.

6. The system of claim 5 wherein, said film is configured to at least partially restrict passage of moisture.

7. The system of claim 6 wherein, the said film is configured to wrap around said carrier conduit, said carrier insulation, said outer conduit, including said two symmetrical flanges, said outer insulation, and said casing.

8. The system of claim 7 in which, said liquid or gas comprises oil, water, or natural gas.

9. The system of claim 8 in which, said casing is configured to help inhibit heat flow away from said outer insulation to a medium across said casing.

10. A system comprising:
    means for carrying a liquid or gas;

means for insulating said carrying means;

means for forming a primary encasing around said insulated carrying means;

means for partially insulating said primary encasing means;

means for enabling expansion and contraction of said carrying means;

means for encasing said partial insulation around said primary encasing; and means for directionally dispersing heat escaping through said insulated carrying means, away from said carrying means.

11. The system of claim 10, further comprising means for anchoring said encasing means with flanges, said flanges disposed to join with said outer conduit.

12. The system of claim 11, further comprising means for directionally dispersing heat escaping through said insulation means around said carrying means.

13. A system comprising of:
a carrier conduit being configured to carry a liquid or gas;
a carrier insulation being configured to encase said carrier conduit, said carrier insulation further being configured to help minimize loss of heat from said liquid or gas, said carrier insulation comprising a material of low thermal conductivity;
an outer conduit configured to encase said carrier insulation, an upper portion of said outer conduit comprising two symmetrical flanges integrally formed on two sides of said outer conduit;
an outer insulation being configured to partially encase said outer conduit, said outer insulation being configured to cover only the bottom portion and two sides of said outer conduit, said outer conduit top portion being configured to remain uncovered and uninsulated, said outer insulation further being configured to help inhibit heat flow from said outer conduit in a radially outward direction;
a casing configured to encase said outer insulation, said casing comprising a substantially low thermal conductivity, said casing further being configured to help divert heat flow through it;
a thin film having a low thermal conductivity, said thin film being configured to at least partially restrict passage of moisture, said thin film further being configured to wrap around said carrier conduit, said carrier insulation, said outer conduit, said outer insulation, and said casing;
wherein an assembly of insulated conduit is configured for placement in a trench with an exposed area of said outer conduit pointing upwardly.

* * * * *